United States Patent

Guedes et al.

[11] Patent Number: 6,016,314
[45] Date of Patent: Jan. 18, 2000

[54] INFORMATION TRANSMISSION SYSTEM COMPRISING AT LEAST ONE BASE STATION AND AT LEAST ONE SATELLITE STATION

[75] Inventors: Yvon Guedes, Lannion; Rémi Sfez, Saint Cloud, both of France

[73] Assignee: U.S. Philips Corporation, New York, N.Y.

[21] Appl. No.: 08/135,370

[22] Filed: Oct. 12, 1993

Related U.S. Application Data

[63] Continuation of application No. 07/857,348, Mar. 25, 1992, abandoned.

[30] Foreign Application Priority Data

Apr. 2, 1991 [FR] France ..................................... 9103949

[51] Int. Cl.[7] .................................................. H04B 7/22
[52] U.S. Cl. ........................................... 370/337; 370/343
[58] Field of Search ................................. 370/23, 29, 21, 370/104.1, 95.1, 95.3, 69.1, 76, 337, 343, 204, 210, 347; 375/38, 40, 100, 58, 53; 455/59; 364/725

[56] References Cited

U.S. PATENT DOCUMENTS

| | | |
|---|---|---|
| 4,222,115 | 9/1980 | Cooper et al. . |
| 4,245,325 | 1/1981 | Kikuchi et al. ............................ 370/23 |
| 4,313,197 | 1/1982 | Maxemchuk ............................... 370/23 |
| 4,577,312 | 3/1986 | Nash ........................................ 370/84 |
| 4,881,241 | 11/1989 | Pommier et al. .......................... 375/38 |
| 5,029,184 | 7/1991 | Andren et al. ............................ 375/40 |
| 5,056,112 | 10/1991 | Wei ........................................... 375/53 |
| 5,124,985 | 6/1992 | Hoshikawa ............................ 370/95.3 |
| 5,170,413 | 12/1992 | Hess et al. ................................ 375/38 |
| 5,191,576 | 3/1993 | Pommier et al. .......................... 370/18 |
| 5,274,629 | 12/1993 | Helard et al. .............................. 375/50 |

FOREIGN PATENT DOCUMENTS 0115330  8/1984  European Pat. Off. .

OTHER PUBLICATIONS

"Performance of Trellis Coded Modulation Using Multi-Frequency Channels in Land Mobile Communications" by Yuklyoshi Kamio, Proc. of IEEE VEH. Tech., May 1990.

Anwendung Der Spread-Spectrum-Technik IM Mobilfunk, Von Ulrich Langewellpott pp. 249-254, 1986.

*Primary Examiner*—Chau Nguyen
*Attorney, Agent, or Firm*—David R. Treacy

[57] ABSTRACT

The system is formed by a base station STB1 and two mobile stations STM1 and STM2. The information exchange between these stations is performed by means of two time multiplex signals which are transported by frequency channels with carriers F1 and F2. In accordance with the invention, the information systematically transmits transformed interleaved data over the two frequency channels. The resistance against fading is notably improved.

16 Claims, 4 Drawing Sheets

INFORMATION TRANSMISSION SYSTEM COMPRISING AT LEAST ONE BASE STATION AND AT LEAST ONE SATELLITE STATION

This is a continuation of application Ser. No. 07/857,348, filed Mar. 25, 1992 abondoned.

BACKGROUND OF THE INVENTION

The invention relates to an information transmission system, comprising at least one base station and at least one satellite station, which stations exchange their information by way of a plurality of time multiplexed signals which are transported in time slots over a plurality of carriers.

The invention also relates to a satellite station and a base station suitable for use in such a system.

A system of this kind is widely used notably in the field of private radio communications.

In this field a problem is encountered in that resources are scarce. In this context, "resource" refers to a number of frequency channels having more or less limited passbands. It is to be noted that despite these limited resources, the quality of the traffic must be as high as possible. A current source of traffic degrading is selective fading. A first known step for counteracting fading is the use of error correction codes; a second known step is the use of different frequency channels for the transmission of consecutive information. This step is described in detail in the article: "Performance of Trellis Coded Modulation Using Multi-Frequency Channels in Land Mobile Communications" by Yuklyoshi Kamio, Proc. of IEEE VEH. TECH., May 1990.

The present invention proposes a system of this kind in which notably the second step is executed, without suffering from the requirements often imposed by the authorities in view of the scarcity of resources.

SUMMARY OF THE INVENTION

To achieve this, the invention is characterized in that for the transmission of useful information between stations coding means form a plurality of interleaved encoded samples of the useful information, frequency dispersion means distribute the samples among the channels having different carrier frequencies, and a transmitter transmits the plurality of samples in the plurality of time slots. At the other end of the transmission link, a receiver receives the plurality of samples thus transmitted, and a demultiplexer and combiner provide a replica of for the information on the basis of the to interleaved encoded samples which are received.

The invention will be described in detail hereinafter with reference to the accompanying drawings

DESCRIPTION OF THE PREFERRED EMBODIMENT

Figure 1:
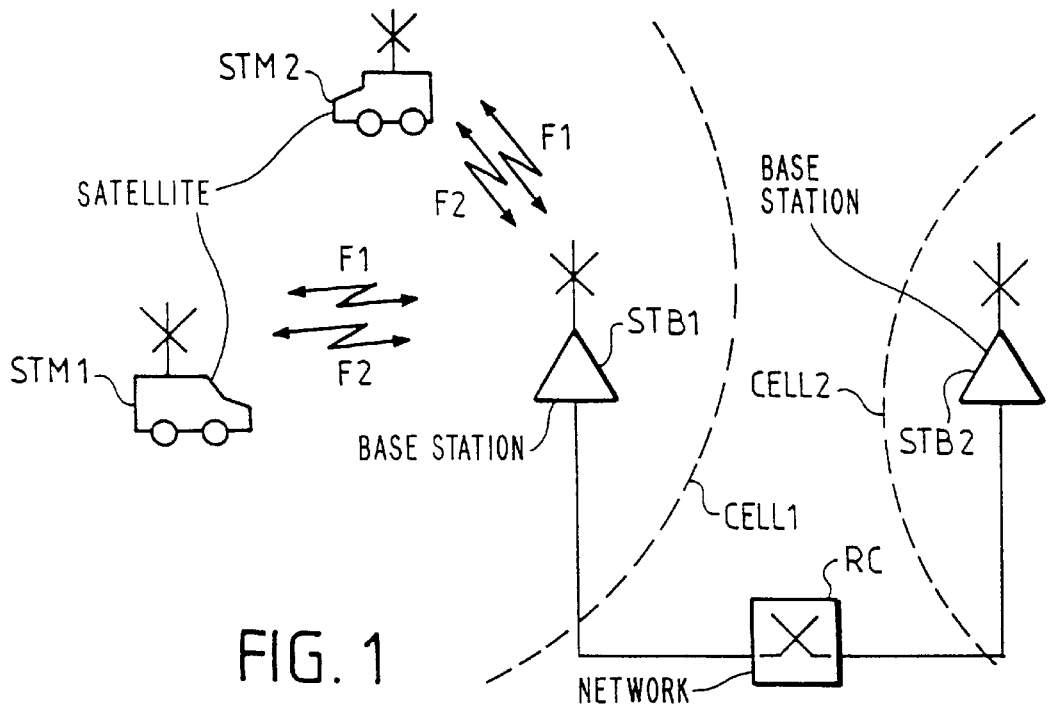
FIG. 1 shows a transmission system in accordance with the invention.

The system which is diagrammatically shown in FIG. 1 is formed by a plurality of cells, only the cells CELL1 and CELL2 being shown in the Figure. In each cell CELL1 and CELL2 there is situated a radio transmission/reception base station STB1 and STB2, respectively. Different vehicles comprising satellite stations STM1 and STM2 can travel within the cells. A switching network RC enables the exchange of information between all cells.

Figure 2A:
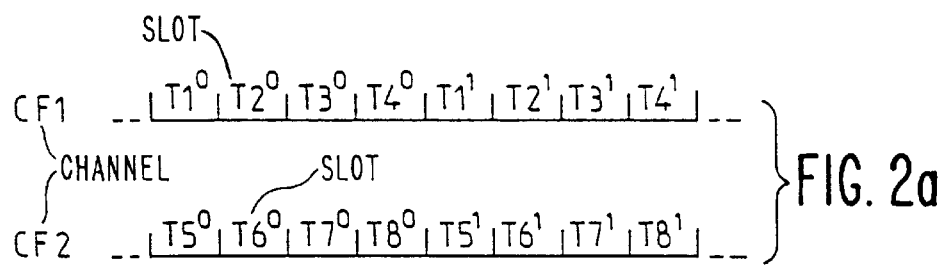
FIG. 2a shows a customarily used TDMA frame structure.

In the present example, two frequency channels CF1, CF2 which are centered around carrier frequencies F1 and F2 are used for the exchange of information between the satellite stations STM1, STM2 and the base station STB1. It will be clear that, if so required by the traffic, other frequency channels can be added without departing from the scope of the invention. These frequency channels are used for transmitting time multiplexed signals of the type TDMA for which FIG. 2a shows a feasible customary organization. Each frequency channel CF1, CF2 is divided into time slots which are denoted by . . . , $T1^0$, $T2^0$, $T3^0$, $T4^0$, $T1^1$, $T2^1$, $T3^1$, $T4^1$, . . . for the first channel and by . . . , $T5^0$, $T6^0$, $T7^0$, $T8^0$, $T5^1$, $T6^1$, $T7^1$, $T8^1$, . . . for the second channel. These references represent the time slots within a parcel, four of which are thus provided for each of the frequency channels: T1 to T4 for the frequency channel CF1 and T5 to T8 for the frequency channel CF2. The exponent of each time slot represents the number of the parcel transported.

Figure 3:
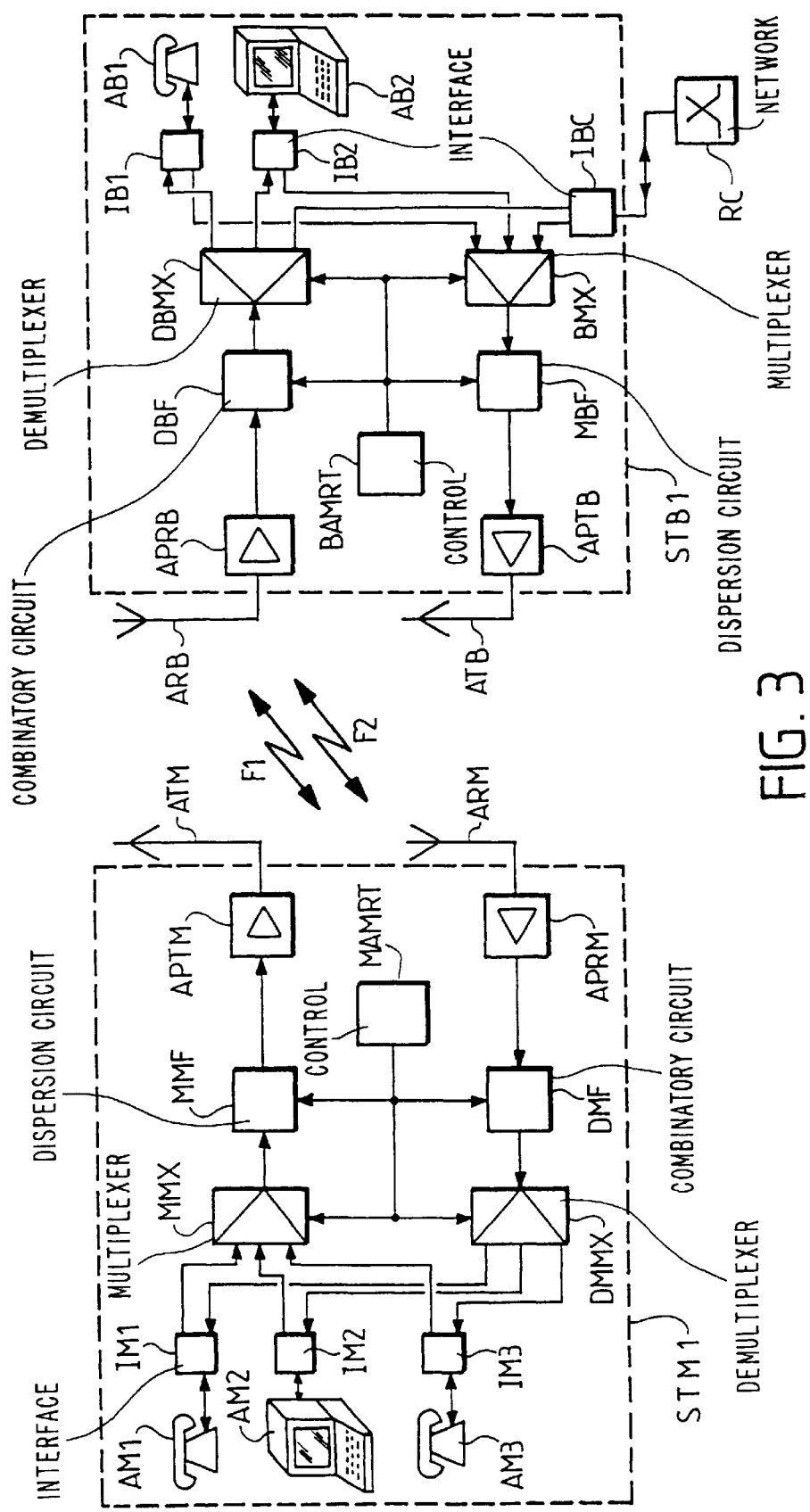
FIG. 3 shows a block diagram of a satellite station and a base station.

FIG. 3 is a more detailed representation of a satellite station, for example the station STM1, and the base station STB1.

A given number of subscriber members AM1, AM2 and AM3 are connected to the satellite station STM1. AM1 and AM3 are telephone sets and AM2 is a data device. The outputs of the various subscriber members are connected to the inputs of a multiplexer MMX, via interface circuits IM1, IM2 and IM3 which perform the customary operations for conditioning the signals so that they are ready for transmission. The signals supplied by the multiplexer MMX are ultimately transmitted via the frequency channels, after processing in a frequency dispersion circuit MMF (whose function will be described in detail hereinafter), and then amplification by a high-frequency amplifier APTM whose output is connected to an antenna ATM. The waves thus transmitted by the antenna ATM can be received by the antenna ARB of the base station STB1, after which they are amplified by the amplifier APRB before undergoing, in the combinatory circuit DBF, the inverse of the treatment performed by the circuit MMF. The signals are thus demultiplexed by the demultiplexer DBMX in order to be applied, via interface circuits IB1, IB2, . . . , IB6, to the subscribers AB1, AB2, . . . , or to the switching network RC.

The station STB1 transmits in a similar manner, utilizing successively a multiplexer BMZ, a circuit MBF, a high-frequency amplifier APTB, and an antenna ATB. The station STM1 also receives information by utilizing a receiving antenna ARM, an amplifier APRM, a circuit DMF and a demultiplexer DMMX.

A control circuit AMRT, denoted by the references MAMRT and BAMRT, respectively, controls the various accesses to the time slots of the multiplex signal for transmission as well as for reception by controlling the circuits MMX, DMMX, MMF and DMF for the former and BMX, DBMX, MBF and DBF for the latter.

A system of this kind has the following problems.

The waves transmitted often suffer from a fading phenomenon and also from additive noise, limiting the performance of the system. In order to counteract this limitation, the use of error correction codes has been proposed.

These codes further reduce the probability of an error as the errors occurring are decorrelated more. Therefore, the fading autocorrelation function is not very compatible with error correction codes.

It has already been proposed to use, in combination with the error correction codes, a time interleaving process which distributes in time the various bits constituting the information to be transmitted so that when the fading phenomenon has a short duration, few bits will be affected. However, if this interleaving is too deep or too extensive, it induces delays which are inadmissible for suitable duplex traffic, notably for the exchange of speech.

In accordance with the invention, there are provided circuits MMF and MBF which serve to improve the immunity of the system to the fading phenomenon and which perform a frequency dispersing or multiplexing operation, and also circuits DBF and DMF which perform the corresponding frequency demultiplexing operation and combine the signals.

Thus, all information to be transmitted, consisting of, for example the interleaved coded information (i.e. the useful information is interleaved in time after addition of an error correction code), is divided into sequences of slot-length parts which are referred to herein as parts, said parts undergoing the frequency multiplexing operation so that the use of excessively deep time interleaving is avoided.

Figure 2B:
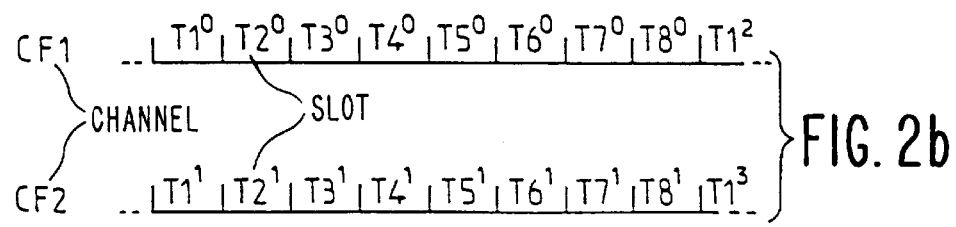
FIGS. 2b and 2c show a TDMA frame structure in accordance with the invention.

In order to execute this multiplexing operation, use is made of the TDMA method chosen for this system; thus, any communication will utilize the frequency channels CF1 and CF2 in an alternating manner. FIG. 2b shows the use of the time channels for carrying out the invention without necessitating supplementary resources. Thus, for the transport of two consecutive parts of a sequence from one original communication or information signal, the frequency channels CF1 and CF2 are alternately used. The part in time slot T1$^0$ of a first time channel transporting a first sequence is transported by means of the frequency channel CF1; the slot of the same time channel which transports the next part of this sequence is transported by means of the channel CF2 and so on alternately for the time slots T1$^2$, T1$^3$, etc. The same holds for the other time slots.

Figure 2C:
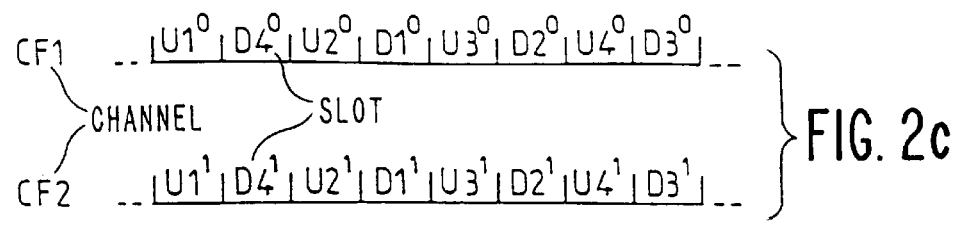

FIG. 2c shows a feasible distribution of the time channels for the transmission directions; given time slots, for example U1$^0$, U1$^1$, U2$^0$, U2$^1$, U3$^0$, U3$^1$, U4$^0$, U4$^1$ are assigned to the transmission direction: satellite station—base station. The transmission in the opposite direction, i.e. base station—satellite station, will utilize the time slots D1$^0$, D1$^1$, D2$^0$, D2$^1$, D3$^0$, D3$^1$, D4$^0$, D4$^1$ utilizing the frequency channels CF1 and CF2. The difference in frequency between the carriers of the channels F1 and F2 must be greater than a few hundreds of kHz. Simultaneity in time occurs between the various channels: U1$^0$ is simultaneous with U1$^1$, D4$^0$ with D4$^1$, etc.

Figure 4:
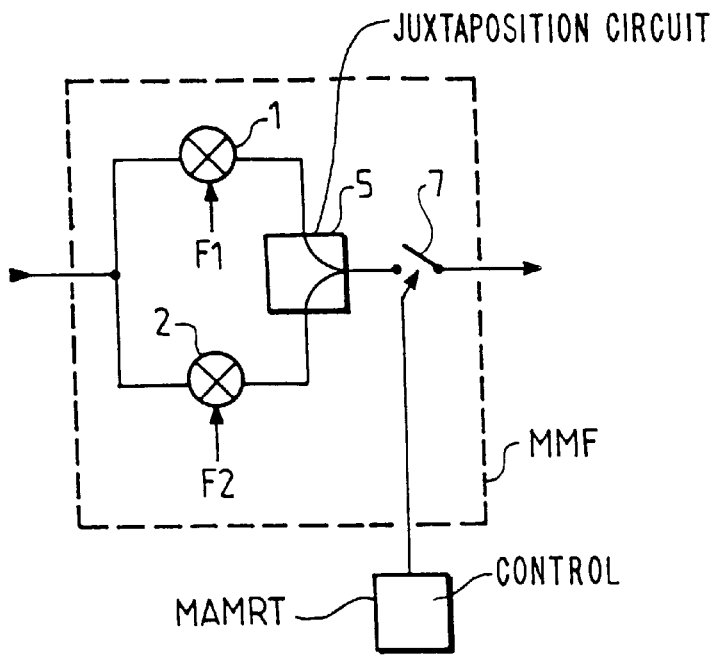
FIG. 4 shows a first example of the use of a frequency dispersion circuit.

FIG. 4 shows a first example of the circuit MMF. The data applied to its input is modulated, in the modulators 1 and 2, by the carrier frequencies F1 and F2, respectively. A juxtaposition circuit 5 combines the signals modulated around 1 and 2 in order to supply the signals in the correct time slot of the TDMA links as represented by a switch 7 which is controlled by the circuit MAMRT.

Figure 5:
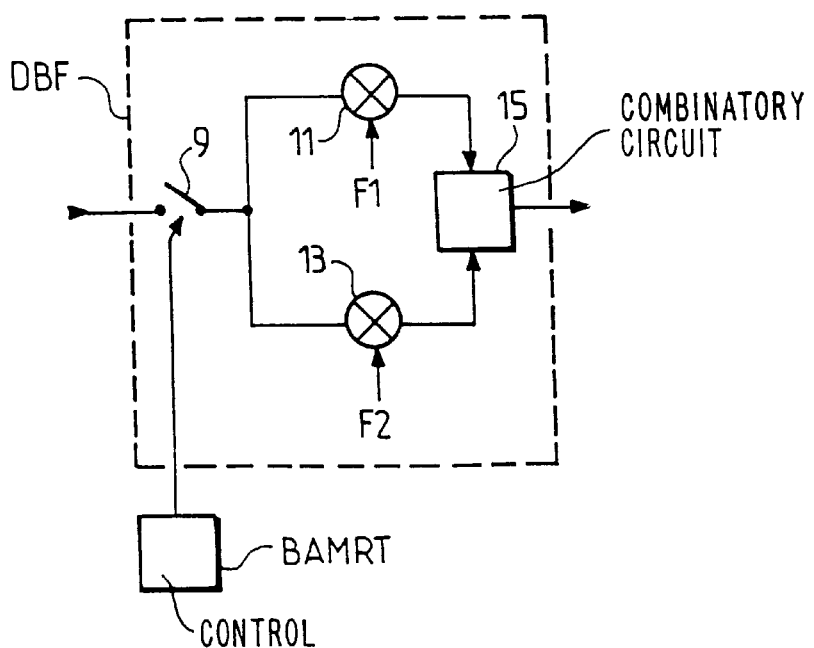
FIG. 5 shows a first embodiment of a combinatory circuit.

FIG. 5 shows a first example of the circuit DBF. The wave received is derived from the correct time slot of the link AMRT, this is represented by a switch 9 which is controlled by the circuit BAMRT. After demodulation of the wave by the demodulators 11 and 13 by way of the carrier frequencies F1 and F2, a combinatory circuit 15 restores the data which is subsequently decoded. The fact that two data symbols consecutively applied to the decoder are subject to independent fading phenomena, due to the multiplexing/demultiplexing process in two sufficiently spaced frequency channels, makes decoding firmer and reduces the residual error rate thus providing a good replica of the original information which was to transmitted.

Figure 6:
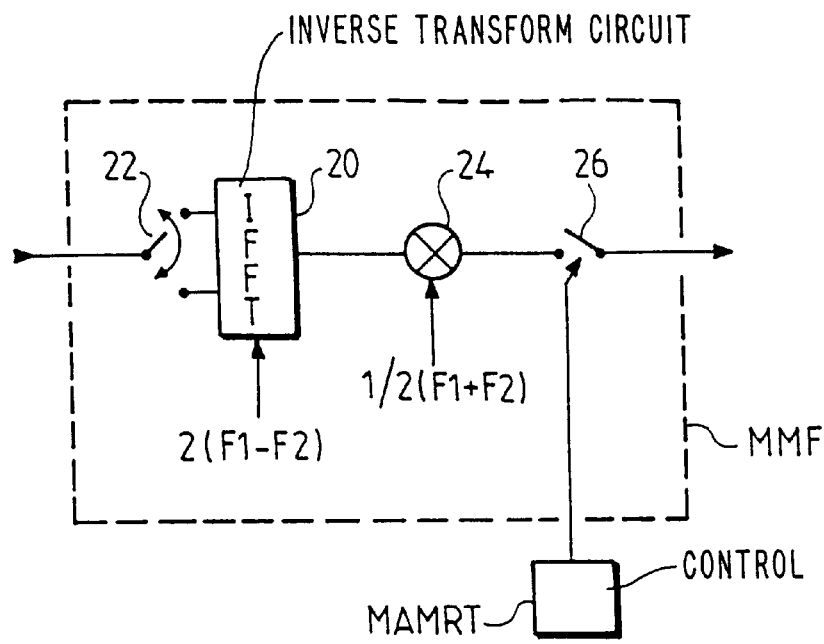
FIG. 6 shows a preferred embodiment of a frequency dispersion circuit.

FIG. 6 shows a preferred embodiment of the circuit MMF.

It is composed of a processing circuit 20 which operates on the basis of a fast inverse Fourier transform. This circuit comprises two inputs, each of which receives a data as represented by the switch 22. At the output of the circuit an intermediate signal has a spectrum with two components which are aligned by a sampling frequency equal to 2 F1–F2, said double spectrum being centred around a frequency F=½(F1+F2) by a modulator 24 so that the signals at the output of this modulator can be placed in the time slot of the multiplex signal AMRT having the carrier frequencies F1 and F2. This is represented by a switch 26 which is controlled by the circuit MAMRT. This distributes the information content of the two inputs between the channels using the carrier frequencies F1 and F2.

Operation of the circuit 20:

For a more general description, the circuit 20 is considered to have N inputs. In order to be compatible with what has already been described, N is taken to be equal to 2.

Assuming that $\{d_k, k+0 \ldots \infty\}$ is the sequence of the 8-PSK coded symbols at the output of the encoder, and G(t) is the shaping function:

$$g(t) = \begin{cases} 1 & 0 \le t < NT_s \\ 0 & \text{ailleurs} \end{cases}$$

The signal in each channel is written as:

$$x^0(t) = \sum_{k=0}^{\infty} d_{kN} g(t - kNT_s)$$

$$x^1(t) = \sum_{k=0}^{\infty} d_{kN+1} g(t - kNT_s)$$

...

$$x^{N-1}(t) = \sum_{k=0}^{\infty} d_{kN+N-1} g(t - kNT_s)$$

The signal of the i$^{th}$ channel is thus actually written as:

$$xi(t) = \sum_{k=0}^{\infty} d_{kN+i} g(t - kNT_s)$$

Each signal is subsequently transposed to the frequency f$_i$ and the signal transmitted is the sum of these N signals:

$$y(t) = \sum_{i=0}^{N-1} \sum_{k=0}^{\infty} d_{kN+i} g(t - kNT_s) e^{j2\pi f_i t}.$$

The equivalent expression is obtained by reversing the sum signs:

$$y(t) = \sum_{k=0}^{\infty} \sum_{i=0}^{N-1} d_{kN+i} e^{j2\pi f_i t} g(t - kT_s)$$

Subsequently, a sampling operation is performed at the frequency $f_e = B_{ut}$ where $B_{ut}$ is the whole bandwidth of the system and is, for example, greater than (F2−F1) and the sampling time of this operation is then $t = mT_e$, where $T_e = 1/f_e$:

$$y(mT_e) = \sum_{k=0}^{\infty} \sum_{i=0}^{N-1} d_{kN+i} e^{j2\pi f_i mT_e} g(mT_e - kNT_s)$$

On the other hand, the frequencies $f_i$ can be equidistant, so that:

$$f_i = \frac{i f_e}{N};$$

$$y_m = y(mT_e) = \sum_{k=0}^{\infty} \sum_{i=0}^{N-1} d_{kN+i} e^{j2\pi \frac{im}{N}} g(mT_e - kNT_s)$$

$$y_m = \sum_{k=0}^{\infty} \left\{ \sum_{i=0}^{N-1} d_{kN+i} e^{j2\pi \frac{i\tilde{m}}{N}} \right\} g(mT_e - kNT_s)$$

where $\tilde{m} = m \bmod N$.

Therefore, the second sum, where $\tilde{m} = m \bmod N$, is nothing but the inverse discrete Fourier transform of the points $\{d_{kN+i}\}_{i=0}^{N-1}$ taken at the instant $\tilde{m} f_e$, $\tilde{m} = 0, \ldots, N-1$.

A similar reasoning could be followed for the circuit DBF.

Such circuits could be realised on the basis of commercially available specific circuits for this type of processing.

Figure 7:
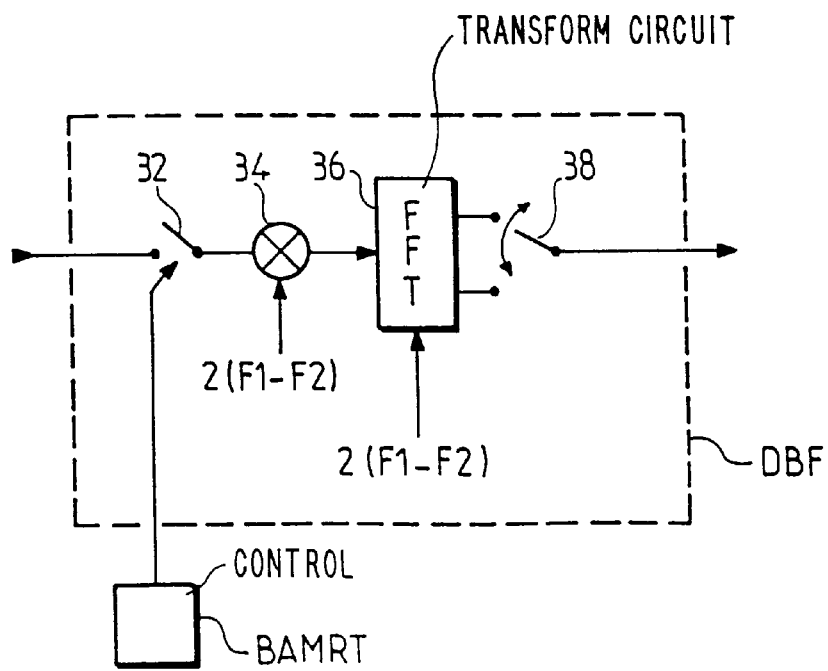
FIG. 7 shows a preferred embodiment of a combinatory circuit.

FIG. 7 shows a preferred embodiment of the circuit DBF.

In the time slot allocated to the reception, the signal having two spectrum components centered around F1 and F2 is received; this is represented by a switch 32 which is controlled by the circuit BAMRT. A demodulator 34 transforms these signals into base band signals by means of a signal having a frequency 2 F1−F2, and a receiver processing circuit 36 which operates on the basis of a fast Fourier transform supplies the data on these two outputs. This data is thus supplied one after the other, alternately on the two outputs as represented by a switch 38 and is substantially identical to the encoded and interleaved data which were received by the switch 22.

Thus, in this preferred embodiment, the system in accordance with the invention does not necessitate the use of supplementary resources because each time slot whose number may be doubled for carrying out the invention transports only half the number of data.

Thus, interleaving of the correct depth can be performed which, introducing a reasonable delay, does not burden the speech communications excessively because it is combined with frequential interleaving.

For example, assuming a noise rate of 8 kbauds, an 8-PSK modulation and a trellis code with a yield of ⅔, an (interleaving/de-interleaving) time of 100 ms, a transmission at 900 MHz, and a speed of the vehicle mobile of 10 km/h, digital simulations will prove that the use of two sub-carriers enables a coding gain of approximately 11 dB.

Thus, a system in accordance with the invention leads to a particularly significant gain in efficiency without modifying existing frequency levels nor the standards of radio equipment and their compatibility, or the structure of the TDMA frames used or the rate per frequency channel.

We claim:

1. An information transmission system, comprising a plurality of stations, said stations being arranged to exchange information signals by transmitting a plurality of time multiplexed signals over a plurality of channels having different carrier frequencies, wherein one of said stations comprises:

means for encoding a first of said information signals with an error correction code, to form a first encoded sample, means for interleaving parts of said first encoded sample to form a first sequence of parts, a multiplexer for generating a succession of parcels, each parcel comprising a plurality of time slots, at least one of said time slots including a portion of said first sequence of parts, and frequency dispersion means for distributing the information content of two successive ones of said parcels for simultaneous transmission as signals in time multiplexed slots of at least two of said channels respectively, said information content being transmitted once only; and another of said stations comprises a receiver comprising:

means for receiving and demultiplexing said signals in said time multiplexed slots of said at least two of said channels, and means for providing a replica of said first of said information signals based on the received signals, whereby, in said receiver, correction of burst errors affecting the content of one channel is simplified without need for redundant transmission.

2. A system as claimed in claim 1, wherein said plurality of channels comprise two channels having different carrier frequencies F1 and F2, and said frequency dispersion means comprises:

a fast inverse Fourier transform processing circuit receiving said two successive ones of said parcels, and producing an intermediate signal having a spectrum having two components aligned around a sampling frequency, and modulator means receiving said intermediate signal and centering said two components about a frequency F=0.5 (F1+F2) to produce an output signal, and multiplexing means for placing said output signal in a selected time slot of said channels respectively.

3. A system as claimed in claim 2, characterized in that said sampling frequency equals 2(F1−F2).

4. A system as claimed in claim 3, wherein said one station is a base station, and said another of said stations is one of a plurality of satellite stations, characterized in that a first time slot of each of said channels is allocated for transmission from a satellite station to said base station, and the next time slot of each of said channels is allocated for transmission by said base station.

5. A system as claimed in claim 2, wherein said one station is a base station, and said another of said stations is one of a plurality of satellite stations, characterized in that a first time slot of each of said channels is allocated for transmission from a satellite station to said base station, and the next time slot of each of said channels is allocated for transmission by said base station.

6. A system as claimed in claim 1, wherein said one station is a base station, and said another of said stations is one of a plurality of satellite stations, characterized in that a first time slot of each of said channels is allocated for transmission from a satellite station to said base station, and the next time slot of each of said channels is allocated for transmission by said base station.

7. A system as claimed in claim 1, characterized in that a given one of said parcels contains one only of the time slots containing parts of said first sequence of parts, said frequency dispersion means comprises means for transmitting each successive parcel over a channel having a carrier frequency different from the carrier frequency of another channel over which the respective preceding parcel is transmitted, in said time multiplexed slots of said channels, and said means for receiving and demultiplexing comprises means for recovery of said first sequence of parts from the respective preceding one and each successive one of said parcels, and means for deinterleaving and decoding said parts of said first sequence to provide said one of said information signals.

8. A system as claimed in claim 7, wherein said first sequence of parts includes first and second contiguous parts, said one of said stations further comprises means for encoding a second of said information signals with an error correction code, to form a second encoded sample, said means for interleaving interleaves parts of said second encoded sample among themselves to form a second sequence of parts including third and fourth contiguous parts, and said frequency dispersion means transmits said first and second parts substantially simultaneously over first time slots of said first and second channels respectively, and transmits said third and fourth parts over second time slots of said first and second channels respectively, said second time slots being the next time slots after said first time slots.

9. A system as claimed in claim 8, for transmitting more than two streams of information signals, wherein said plurality of channels consists of two channels, and said frequency dispersion means transmits a first two consecutive parts of the sequence for each stream of information signals respectively, one of said first two parts being transmitted over one channel and the other of said first two parts being transmitted over the other channel, prior to transmitting the next two consecutive parts of said first sequence.

10. A system as claimed in claim 7, for transmitting more than two streams of information signals, wherein said plurality of channels consists of two channels, and said frequency dispersion means transmits a first two consecutive parts of the sequence for each stream of information signals respectively, one of said first two parts being transmitted over one channel and the other of said first two parts being transmitted over the other channel, prior to transmitting the next two consecutive parts of said first sequence.

11. A system as claimed in claim 7, wherein said one station is a base station, and said another of said stations is one of a plurality of satellite stations, characterized in that a first time slot of each of said channels is allocated for transmission from a satellite station to said base station, and the next time slot of each of said channels is allocated for transmission by said base station.

12. A satellite station, for use in an information transmission system comprising at least one base station, said base station being arranged to simultaneously transmit at least two different parcels of time multiplexed signals respectively over at least two respective channels having different carrier frequencies, each parcel comprising a plurality of time multiplexed slots, said time multiplexed signals including the information content of two successive ones of parts of a first sequence, said first sequence comprising interleaved parts of a first sample of an information signal which has been encoded with an error correction code, the information content of said two successive ones being distributed between said two different parcels without redundancy, said satellite station comprising a receiver including means for receiving at least said two channels having different carrier frequencies F1 and F2, demultiplexing means for selecting said time multiplexed slots of said two channels containing said information content, combinatory means, responsive to the information content of the selected time multiplexed slots, for producing a second sequence of parts substantially identical to said first sequence of parts, and means for deinterleaving and decoding said second sequence of parts to provide a replica of said information signal, whereby, in said receiver, correction of burst errors affecting the content of one channel is simplified without need for redundant transmission.

13. A satellite station as claimed in claim 12, wherein said two channels have two spectrum components centered around said frequencies F1 and F2, characterized in that said combinatory means comprises means for demodulating said two spectrum components to provide base band signals, and a processing circuit operating on the basis of a fast Fourier transform to produce said second sequence.

14. A base station for use in an information transmission system comprising at least one satellite station, said base station being arranged for transmitting a first information signal by transmitting a plurality of time multiplexed signals over a plurality of channels having different carrier frequencies, and comprising:

means for encoding a first of said information signals with an error correction code, to form a first encoded sample, means for interleaving parts of said first encoded sample to form a first sequence of parts, a multiplexer for generating a succession of parcels, each parcel comprising a plurality of time slots, at least one of said time slots including a portion of said first sequence of parts, and frequency dispersion means for distributing the information content of two successive ones of said parcels for simultaneous transmission as signals in time multiplexed slots of two of said channels respectively, said information content being transmitted once only, whereby, in said satellite station, upon receipt of signals transmitted by said base station in said time multiplexed slots, correction of burst errors affecting the content of one channel is simplified without need for redundant transmission.

15. A base station as claimed in claim 14, wherein said plurality of channels comprise two channels having carrier frequencies F1 and F2, and said frequency dispersion means comprises:

a fast inverse Fourier transform processing circuit receiving said two successive ones of said parcels, and producing an intermediate signal having a spectrum having two components aligned around a sampling frequency, and modulator means receiving said intermediate signal and centering said two components about a frequency F=0.5 (F1+F2) to produce an output signal, and multiplexing means for placing said output signal in a selected time slot of said channels respectively.

16. A base station as claimed in claim 15, characterized in that said sampling frequency equals 2(F1−F2).

\* \* \* \* \*